Mar. 27, 1923.

W. V. VAN ETTEN 1,450,123

ROTARY SPIKE TOOTH HARROW

Filed Oct. 10, 1921

INVENTOR,
William V. Van Etten.
BY
David E. Lain,
ATTORNEY.

Patented Mar. 27, 1923.

1,450,123

UNITED STATES PATENT OFFICE.

WILLIAM V. VAN ETTEN, OF NEW WESTMINSTER, CANADA.

ROTARY SPIKE-TOOTH HARROW.

Application filed October 10, 1921. Serial No. 506,616.

*To all whom it may concern:*

Be it known that I, WILLIAM V. VAN ETTEN, a citizen of the United States, now residing at New Westminster, in the Province of British Columbia, Dominion of Canada, have invented a new and useful Rotary Spike-Tooth Harrow, of which the following is a specification.

My invention relates to improvements in rotary, spike-tooth harrows, and the object of my improvements is to provide a spike-tooth harrow in which the teeth are forced through the soil at a greater rate of speed and are more effective in breaking up the soil than when merely dragged through the same as usual.

Figure 1:
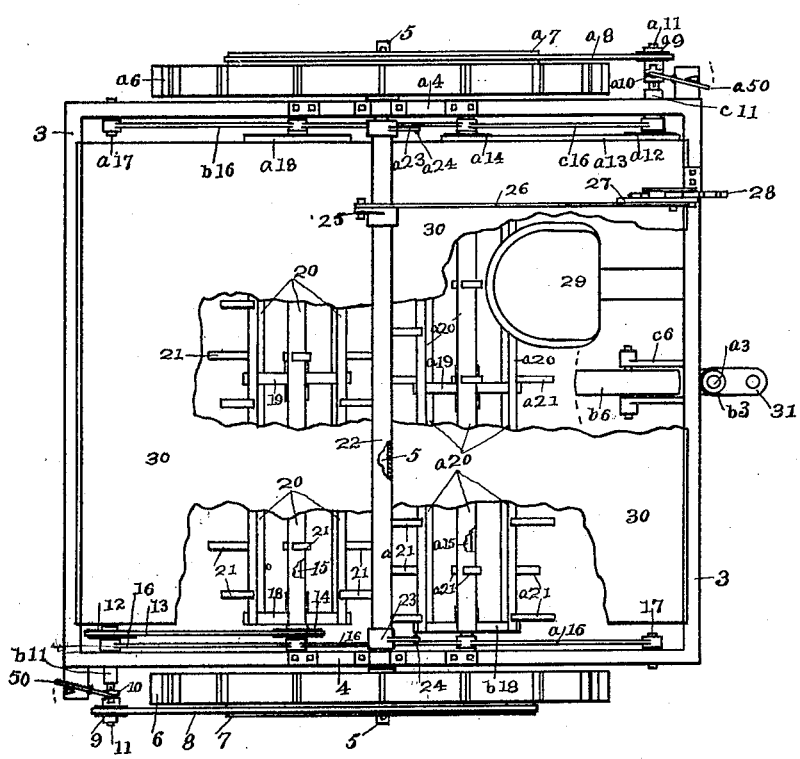
Figure 2:
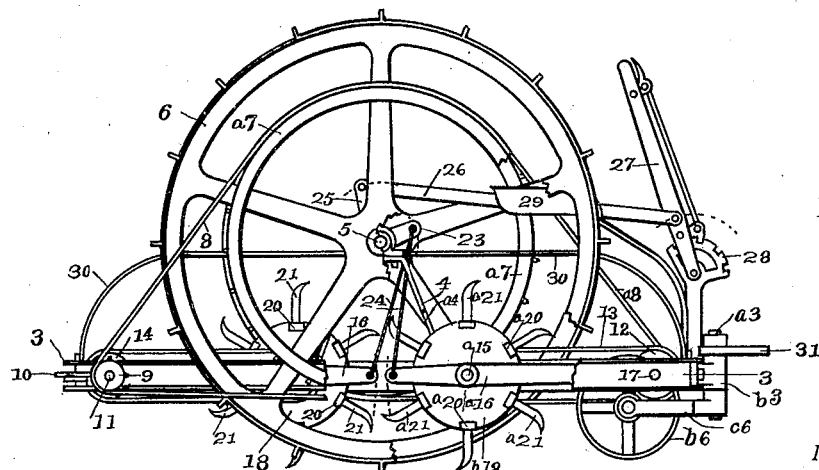

I attain this object with the mechanism illustrated in the accompanying sheet of drawings in which Figure 1 is a plan view of my harrow and Fig. 2 is a side elevation of Fig. 1.

Similar characters refer to similar parts throughout, and certain parts are broken away to show other parts hidden thereby.

More particularly: The rectangular harrow frame is shown at 3. A short shaft $a^3$ is mounted for revolution vertically in bearing $b^3$ fastened to the middle front of frame 3. Bracket 4 is fastened to the right side of frame 3 and bracket $a^4$ to the left side of the same, extending upward, and to them is fixed wheel axle 5. Vehicle and drive wheels 6 and $a^6$ are mounted for revolution on the ends of axle 5. Swiveling wheel $b^6$ is mounted for revolution on a shaft fixed in yoke arm $c^6$ mounted fixed on the lower end of shaft $a^3$. Sprocket 7 is fixed concentric on the outside of wheel 6 and sprocket $a^7$ is fixed concentric on the outside of wheel $a^6$. Sprocket chain 8 connects sprockets 7 and 9, and sprocket chain $a^8$ connects sprockets $a^7$ and $a^9$. Sprocket 9 is mounted for revolution on the outer end of shaft 11, and sprocket $a^9$ is mounted for revolution on the outer end of shaft $a^{11}$. Both sprockets 9 and $a^9$ have a positive clutch on the inner end of their hubs. On shaft 11 is mounted positive clutch 10 which is engaged with a spline on said shaft and reciprocal thereon into and out of engagement with the clutch on the hub of sprocket 9. A pivoted yoke lever 50 is engaged with an annular groove in clutch 10 and serves to hold said clutch in and out of engagement with sprocket 9. On shaft $a^{11}$ is mounted positive clutch $a^{10}$ which is engaged with a spline on said shaft and is reciprocal thereon into and out of engagement with a positive clutch on the inner end of the hub of sprocket $a^9$. A pivoted yoke lever $a^{50}$ is engaged with an annular groove in sprocket $a^{10}$ and serves to hold said clutch in and out of engagement with sprocket $a^9$. Shaft 11 is mounted for revolution in a bearing $b^{11}$ on the rear end of the front side of frame 3. On the inner end of shaft 11 is mounted fixed sprocket 12, and on the inner end of shaft $a^{11}$ is mounted fixed sprocket $a^{12}$. Sprocket chain 13 connects sprocket 12 with sprocket 14, and sprocket chain $a^{13}$ connects sprocket $a^{12}$ with sprocket $a^{14}$. A rear spike wheel shaft 15 is mounted for revolution in bearings in link arms 16 and $b^{16}$. Link arm 16 is mounted for oscillation externally on bearing $b^{11}$, and link arm $b^{16}$ is mounted for oscillation on pin $a^{17}$ fixed in the rear end of the rear side of frame 3 in line with shaft 11. A front spike wheel shaft $a^{15}$ is mounted for revolution in bearings in link arms $a^{16}$ and $c^{16}$. Shafts 15 and $a^{15}$ are substantially parallel. Link arm $a^{16}$ is mounted for oscillation on pin 17 fixed in the front end of the front side of frame 3, and in line with shaft $a^{11}$. Link arm $c^{16}$ is mounted for oscillation externally on bearing $c^{11}$. Fastened on shaft 15 are end discs 18 and $a^{18}$ and middle disc 19. In spaced notches in the periphery of these discs are fastened six spike bars 20, 20, and in these bars at spaced intervals are fixed curved-end spike teeth 21, 21. On shaft $a^{15}$ are mounted fixed end discs $b^{18}$ and $c^{18}$ and middle disc $a^{19}$. In spaced notches in said discs are fixed six spike bars $a^{20}$, $a^{20}$, and fixed in these bars at spaced intervals, placed so as not to interfere when revolving with the spikes 21, are curved-end spike teeth $a^{21}$, $a^{21}$. A hollow shaft 22 is mounted for oscillation on axle shaft 5, and to its ends are fixed cranks 23 and $a^{23}$. Crank 23 is connected to the ends of link arms 16 and $a^{16}$ by cables 24, 24, and crank $a^{23}$ is connected with the ends of link arms $b^{16}$ and $c^{16}$ with cables $a^{24}$. Crank 25 is fixed to hollow shaft 22 and is connected to hand lever 27 by rod 26. Hand lever 27 is held in one of several positions by a dog engageable in a segmental rack 28 fastened to the front of frame 3. A driver's seat 29 is mounted on a bar the lower end of which is fastened to the front of frame 3. This seat is fixed within easy reach of hand lever 27. A cover 30 is mounted on the front and back of frame 3 and extends over the highest operative positions of spike teeth 21 and $a^{21}$. And a draw bar 31 is connected to shaft $a^3$.

In operation: As illustrated this harrow is adapted for hauling by horse or tractor by hitching to bar 31. When thus drawn, wheels 6 and $a^6$ revolve in a clockwise direction and cause a similar and more rapid revolution of both tooth wheels. Transmission of rotation from wheels 6 and $a^6$ causes the frame to tilt forward bearing its front end downward. This frame movement is stopped by swivel wheel $b^6$. When cables are used to connect cranks 23 and $a^{23}$ with arms 16, $a^{16}$, $b^{16}$ and $c^{16}$, as illustrated, the teeth 21 and $a^{21}$ are forced into the ground by the weight of the structures to which they are fastened and by the curved ends of said teeth, and the extreme depth to which the teeth can enter the soil is controlled by the set of lever 27 which can retain them above the ground or permit them to enter a tooth length in the same. Thus with connecting cables 24 and $a^{24}$ the teeth are free to enter the soil more or less as its condition will permit while they are passed rapidly backward through it as the harrow structure is drawn forward. But if it is desired to bring the weight of the entire structure to bear in forcing the teeth into the soil, rigid connections are used to replace said cables and the teeth are held down to the work as desired.

Preferably the revolvable frames bearing the teeth are placed near enough together in order to cause the teeth on the two frames to overlap as they revolve. This causes one set of revolving teeth to aid in freeing the other set from weeds, vines, or the like, which might tend to twist around said frames.

As illustrated, clutches 10 and $a^{10}$ are engaged causing the mechanism to be in gear and adapted for work. But by moving levers 50 and $a^{50}$ to their other positions the clutches are disengaged and the rolling of wheels 6 and $a^6$ merely cause the revolution of sprockets 9 and $a^9$ on their shafts.

While I have so far confined this disclosure of the reduction to practice of my invention to power means for operating the revolvable harrow teeth derived from wheels 6 and $a^6$, it is evident, of course, that a harrow of this kind can be operated entirely and effectively by a prime mover mounted on the harrow frame with suitable power-transmission connections with wheels 6 and $a^6$ and the revolvable tooth wheels.

Having thus fully disclosed my invention, what I claim is new and desire to secure by Letters Patent is,—

In combination, a harrow frame, a wheel axle fastened transversely on said frame, two drive wheels, one mounted for revolution on each end of said axle adapted to roll on the ground and engage therewith, two pairs of arms the outer ends of each pair pivoted to one of the ends of said harrow frame parallel with said axle and the inner ends of each of said pairs of arms having bearings, two rotatable, spike-tooth harrows, each mounted for revolution in one of said pairs of arm bearings near and parallel with said axle, and power connections between each of said drive wheels and one of said rotary harrows whereby both of said harrows are revolved as said harrow frame is drawn along while they oscillate on said arm pivots.

WILLIAM V. VAN ETTEN.